(12) United States Patent
Foss et al.

(10) Patent No.: US 6,401,958 B1
(45) Date of Patent: Jun. 11, 2002

(54) LID CLOSURE SYSTEM

(75) Inventors: George T. Foss; Frank E. Heywood; William M. Maser, all of Cambridge (CA)

(73) Assignee: 3L Filters Ltd., Ontario (CA)

( * ) Notice: Subject to any disclaimer, the term of this patent is extended or adjusted under 35 U.S.C. 154(b) by 0 days.

(21) Appl. No.: 09/699,921

(22) Filed: Oct. 30, 2000

Related U.S. Application Data

(63) Continuation-in-part of application No. 09/585,528, filed on Jun. 1, 2000.
(60) Provisional application No. 60/169,925, filed on Dec. 10, 1999.

(51) Int. Cl.$^7$ .............................................. B65D 45/32
(52) U.S. Cl. ..................... 220/320; 220/321; 292/256.6
(58) Field of Search ................................ 220/319–321, 220/324, 293, 262; 292/256.6, 256.65, 256.67, 256.69, 259.75

(56) References Cited

U.S. PATENT DOCUMENTS

| | | | | |
|---|---|---|---|---|
| 2,130,701 A | * | 9/1938 | Thomas | 220/320 |
| 3,077,360 A | | 2/1963 | Israel | |
| 3,144,165 A | | 8/1964 | Pegon et al. | |
| 3,235,124 A | | 2/1966 | Kuever | |
| 3,310,329 A | | 3/1967 | Luker | |
| 3,642,166 A | * | 2/1972 | Starr | 220/320 |
| 4,157,146 A | * | 6/1979 | Svenson | 220/324 |
| 4,288,001 A | | 9/1981 | Lankston | |
| 4,347,944 A | | 9/1982 | Moldrup | |
| 4,500,010 A | * | 2/1985 | Schutz | 220/320 |
| 4,715,565 A | * | 12/1987 | Wittmann | 220/321 |
| 5,193,864 A | | 3/1993 | Coleman | |
| 5,823,340 A | * | 10/1998 | Maihofer | 220/320 |
| 5,908,210 A | * | 6/1999 | Fetzer | 220/320 |

FOREIGN PATENT DOCUMENTS

| | | | |
|---|---|---|---|
| CA | 319524 | | 3/1931 |
| DE | 2824931 | * | 12/1979 |
| DE | 3238076 | * | 9/1983 |

* cited by examiner

*Primary Examiner*—Nathan J. Newhouse
(74) *Attorney, Agent, or Firm*—Alston & Bird LLP

(57) ABSTRACT

A pressurized vessel having a quick release lid closure system for clamping a vessel lid to a vessel container comprises an open hoop with spaced apart ends. The hoop carries a plurality of spaced apart clamped blocks which having wedge-shaped channels for mating engagement with opposing lugs on the lid and container. The spaced apart hoop ends are pulled towards one another to reduce the circumference of the hoop to move the clamp blocks onto the corresponding lugs and draw the lugs together to seal the lid to the container.

27 Claims, 15 Drawing Sheets

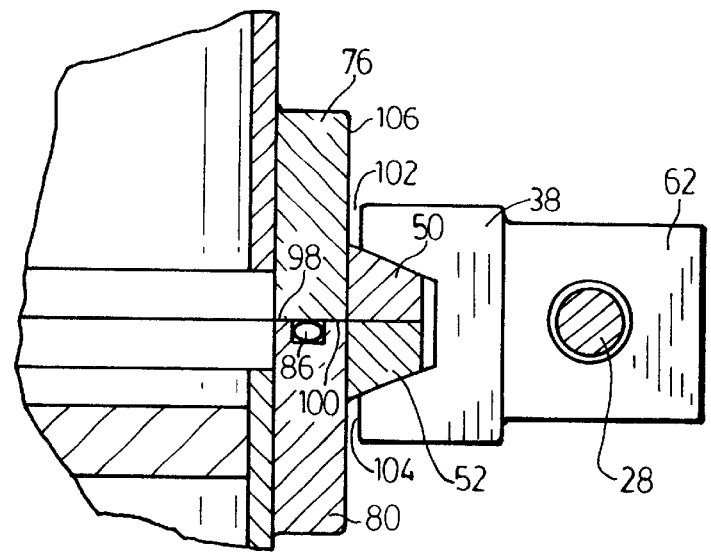
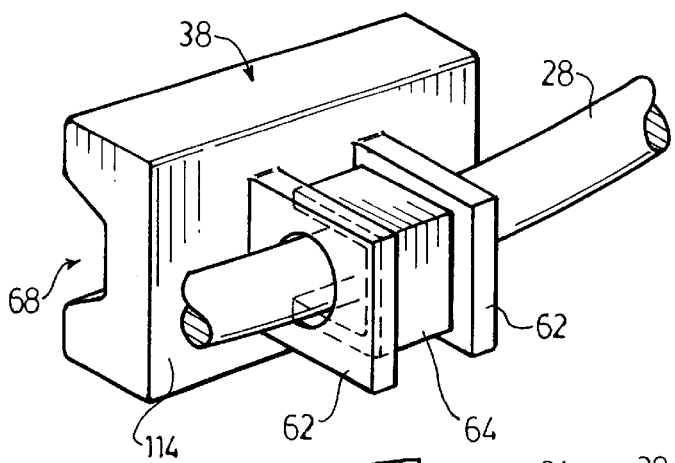
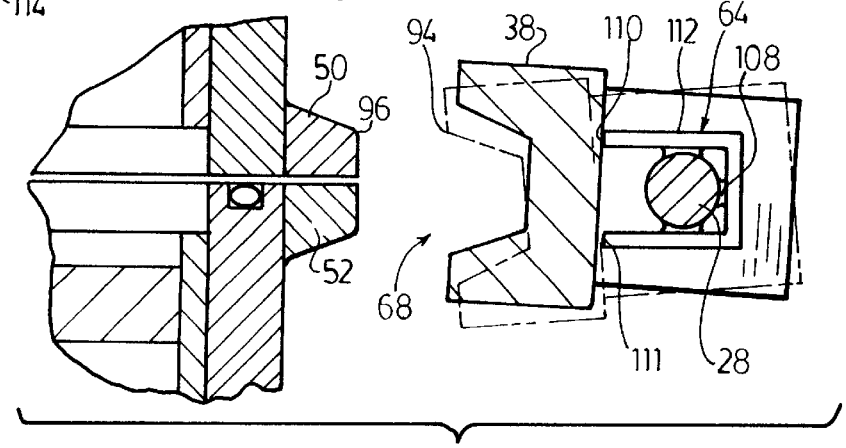

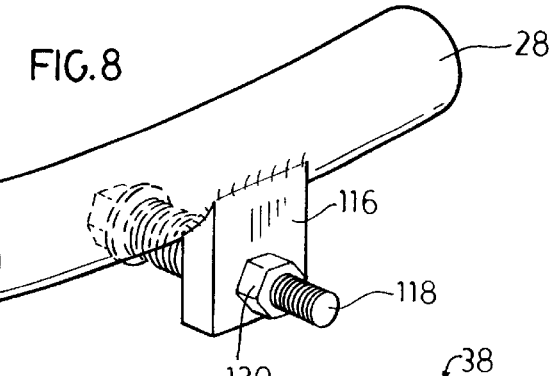
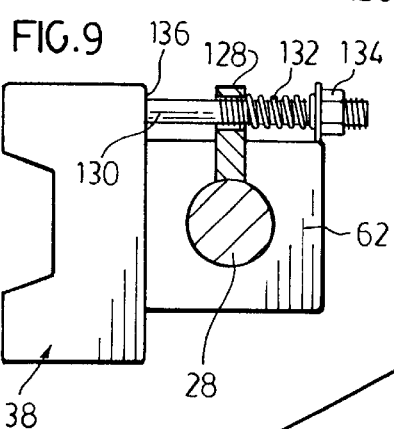
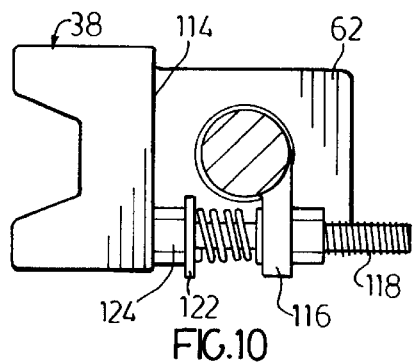
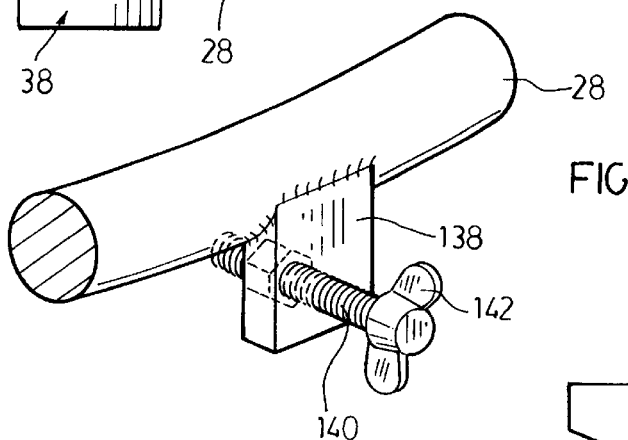
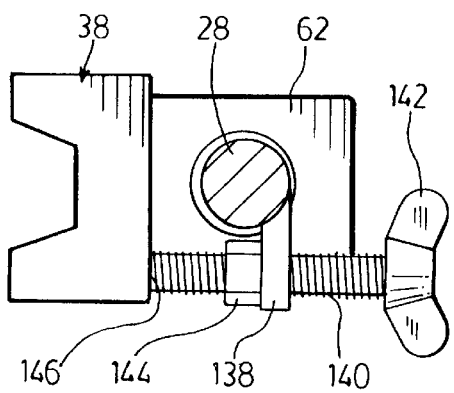

LID CLOSURE SYSTEM

CROSS-REFERENCE TO RELATED APPLICATIONS

This application is a continuation-in-part of copending U.S. application Ser. No. 09/585,528, filed on Jun. 1, 2000, which is hereby incorporated herein in its entirety by reference, which claims priority to U.S. Provisional Application No. 60/169,925 filed Dec. 10, 1999.

FIELD OF THE INVENTION

This invention relates to lid closure devices for vessels and more particularly, vessels which operate either under negative or positive pressure.

BACKGROUND OF THE INVENTION

Typical closure devices for vessels are described in Canadian Patent 319,521 and U.S. Pat. Nos. 3,144,165; 3,310,329; 4,347,944 and 5,193,864.

U.S. Pat. No. 3,077,360 describes a bolted clam shell type closure device for a pressurized vessel lid. Two hemispherical shaped bands are drawn together to clamp machined wedge-shaped perimeter ledges together to seal the lid to the vessel. U.S. Pat. No. 4,288,001 also discloses separable circular shaped bands where hydraulic cylinders are used to draw the bands together to effect a clamping action of the lid to a vessel. The bands include a channel which fit over machined vessel and lid ledges to clamp the lid to the vessel. U.S. Pat. No. 3,235,124 describes a closure system which rotates a plurality of wedges by use of a perimeter ring to engage the vessel wall and seal the lid to the vessel.

In addition to the circular clam shell type closure devices, there are the standard swing bolt or through bolt clamping designs for securing the lid to the vessel. Although these closure designs work very well they are subject to misalignment and distortion due to uneven tightening of the bolts and hence are inherently slow to open and close.

These various lid closure designs suffer from a host of drawbacks including complex designs for the closure, intensive fabrication techniques to achieve proper seal, heavy components which are bulky and awkward to handle and detract from quick release, custom designs for each vessel diameter and little, if any, accommodation in respect of tolerances in fabrication. An object of an aspect of this invention is to provide a quick release closure which is particularly suited to positive and negative pressure vessels and particular high pressure vessels for containing liquids.

SUMMARY OF THE INVENTION

In accordance with an aspect of this invention, a quick release closure system is provided for securing a lid to a vessel. The quick release system comprises a plurality of evenly spaced apart periphery located lugs secured to the vessel lid and vessel wall where respective sets of lugs opposed one another. A corresponding plurality of clamping blocks are carrier on a ring which encompasses the perimeter of the lid and vessel where the ring is drawn inwardly to force the clamp blocks onto the lugs to effect closure of the lid on the vessel.

According to an aspect of the invention, a pressurized vessel having a quick release lid closure system for clamping a vessel lid to a vessel container, i) the lid having about its perimeter a plurality of circumferentially spaced apart lid lugs, the container having about its opening perimeter a corresponding number of opposing circumferentially spaced apart container lugs, the lid lugs and container lugs defining sets of opposing lugs, the opposing lugs having sloped faces which define a truncated wedge narrowing outwardly from the vessel, the wedge having a gap defined between the opposing lid lugs and container lugs, a compression seal provided between the lid and container for sealing the vessel when the lid is closed;

ii) the closure system comprises an open hoop with spaced apart ends, the hoop carrying a plurality of spaced apart clamp blocks corresponding in number to the plurality of lug sets, each said clamp block having a truncated wedge shaped channel for mating engagement with the truncated wedge of a corresponding lug set;

iii) means for pulling the spaced apart hoop ends towards one another to reduce the circumference of the hoop to move the clamp blocks onto corresponding said wedges and by virtue of the mating engagement of the clamp blocks with the wedges, drawing the opposing lugs together to close the gap and to seal the lid to the container by compressing the compression seal.

According to another aspect of the invention, a pressurized vessel having a quick release lid closure system for clamping a vessel lid to a vessel container, i) the vessel lid and/or the vessel container having a plurality of spaced apart first components of the lid closure system;

ii) a hoop positioned about the vessel and located opposite the first components of the lid closure system, the hoop carrying a corresponding plurality of a second component of the lid closure system, the plurality of the second components being aligned with the first components, the hoop having spaced apart ends;

iii) means for pulling said hoop spaced apart ends towards one another to move said second components onto said first components to an extent which clamps said lid to said container, said pulling of said hoop ends towards one another exerting an inwardly radially directed force of said second components on said first components; and wherein said first component is a lug provided on said lid and said second component is a swing lug pivotally mounted on said vessel, said hoop carrying said swing lugs to pivot them towards and move said lid lugs to draw said lid closed on said container when said means pulls said hoop ends towards one another.

BRIEF DESCRIPTION OF THE DRAWINGS

Preferred embodiments of the invention are shown in the drawings wherein:

FIG. 5 is the section of FIG. 4 with the clamp block squeezing the container lugs;

FIG. 6 is an alternative setup for the clamp block;

FIG. 7 is a section through the clamp block of FIG. 6;

FIGS. 8, 9 and 10 show alternative embodiments for the guide system for the clamp block;

FIGS. 11 and 12 show yet a further alternative embodiment for the clamp block;

DETAILED DESCRIPTION OF THE PREFERRED EMBODIMENTS

Figure 1:
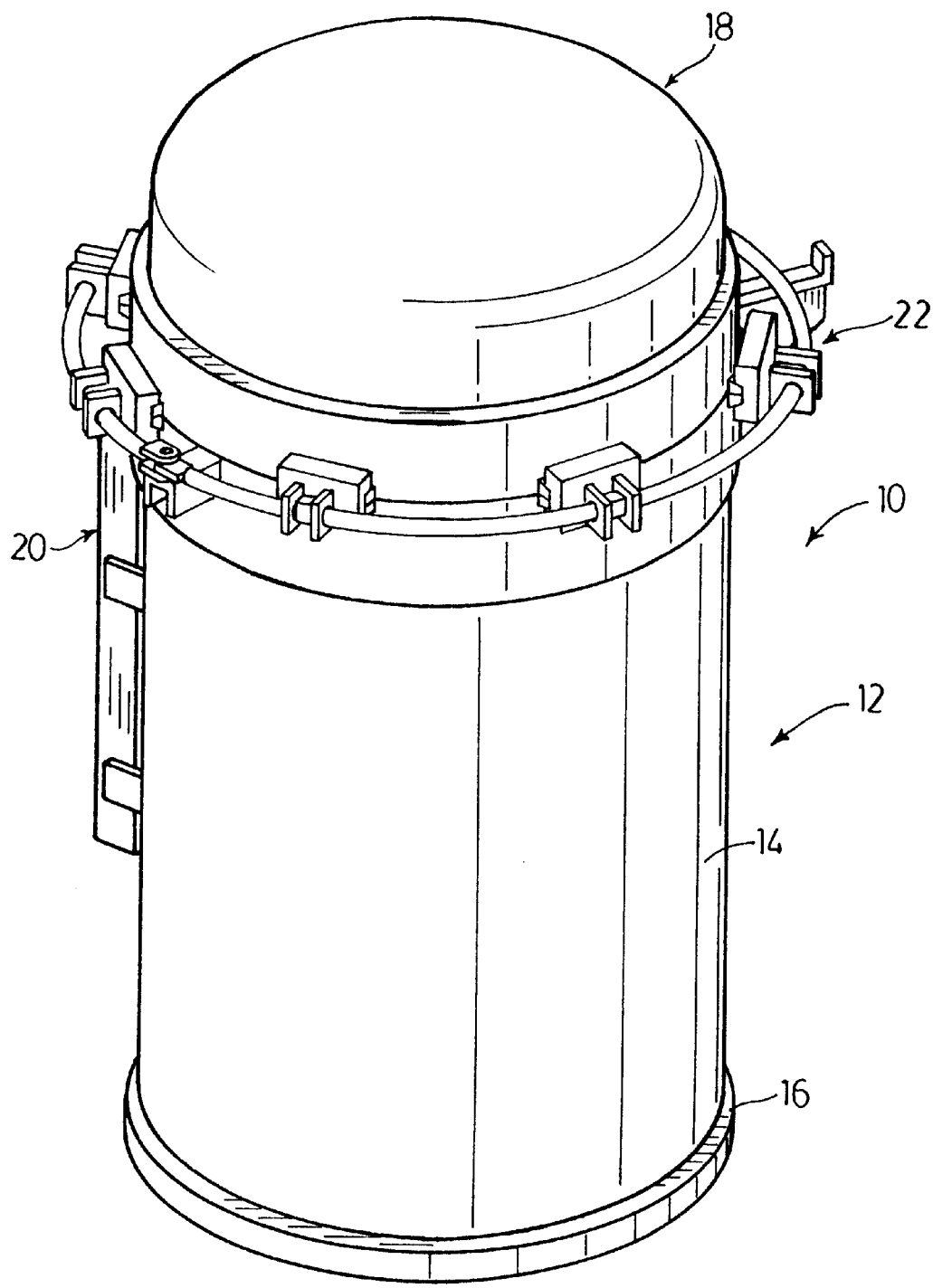
FIG. 1 is a perspective view of a pressure vessel having a quick release closure in accordance with one aspect of the invention for closing a lid on a pressure vessel.

With reference to FIG. 1, a pressurized vessel 10 has a container 12 with container wall 14 and container base 16 and vessel lid 18. The lid 18 is hinged at the rear of the vessel (not shown) with a lid lift assembly 20 to assist in raising the lid to an opened position. The lid lift assist device 20 is described in more detail in applicant's co-pending U.S. application Ser. No. 09/592,158 filed Jun. 12, 2000. In order to provide for a quick connection and release of the lid to the vessel container 12, a quick release closure system 22 is provided. The system is capable of quickly sealing the lid to the container to resume operation of the vessel or alternately quickly release the lid from the container to facilitate opening the vessel for service. Such quick release and closure is required in vessels which need to be opened periodically for service which might occur on a daily basis.

Figure 2:
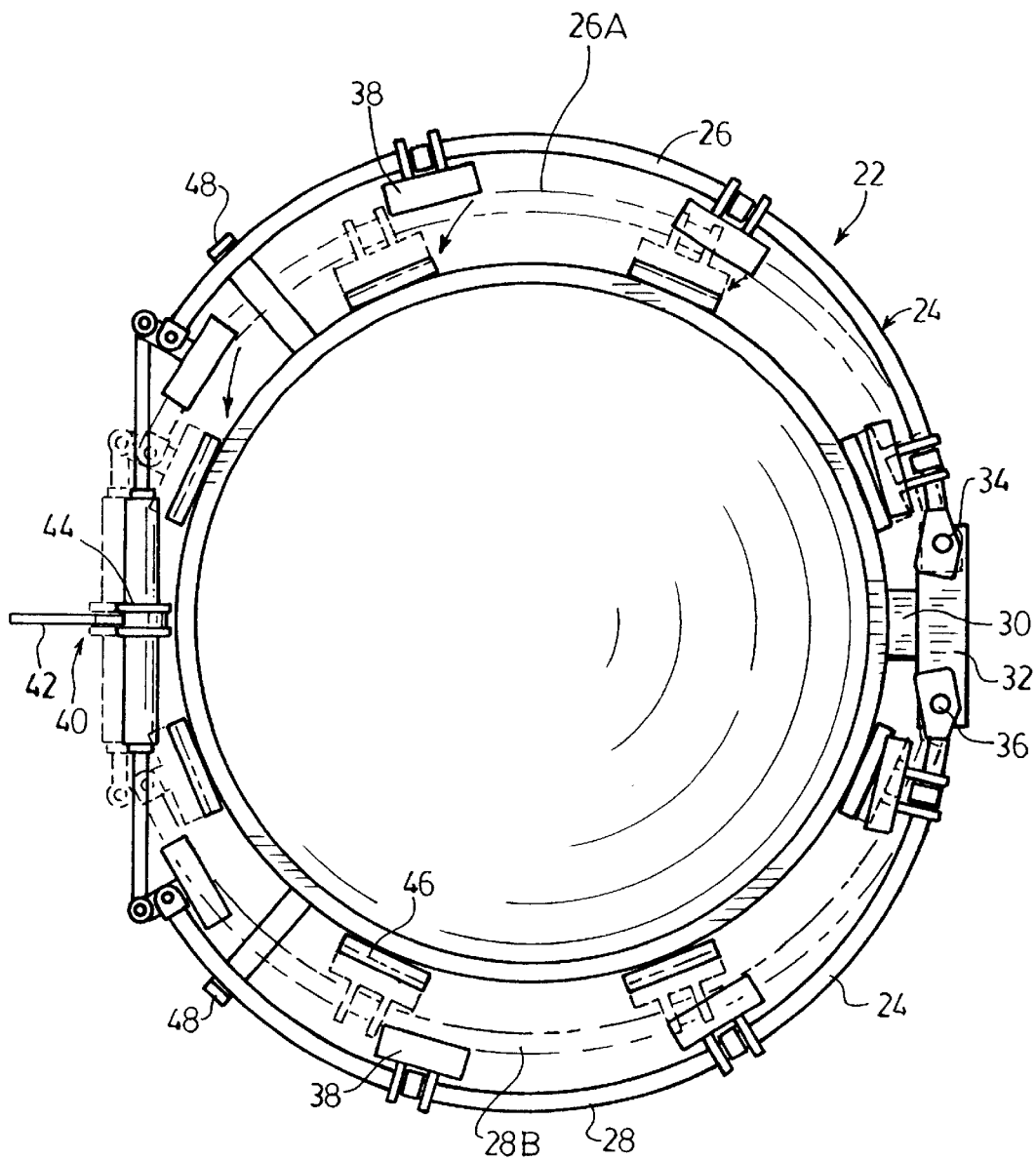
FIG. 2 is a top view of the pressure vessel of FIG. 1 illustrating the lid closure system in the lid open and lid closed positions.

The quick release and closure system 22 is shown in more detail in FIG. 2. The system 22 comprises a perimeter hoop generally designated 24 and in accordance with this particular embodiment comprises two hoop portions 26 and 28. The hoop portions 26 and 28 are semi-circular in shape and are connected to the vessel wall by a standard 30 with horizontal member 32 providing pivot points 34 and 36 for the mounting of the hoops 26 and 28 to the member 32. The hoops 26 and 28 can be moved from their closed position, as shown in dot in FIG. 2 at 26a and 28b to their open position shown in solid line. Each hoop 26 and 28 carries a plurality of clamping blocks generally designated 38 which are shown in more detail in FIGS. 3, 4 and 5. The respective hoops 26 and 28 are drawn together by way of cramp screw mechanism 40 which includes a crank arm 42. The crank arm 42 is mounted on a ratchet system 44 which may be toggled to either draw the hoops together or release them by allowing them to move apart. As the hoops 26 and 28 are drawn together the clamp blocks 38 clamp the lugs 46 to secure the lid to the vessel wall. Further details of the lugs will be described with respect to FIGS. 3, 4 and 5. Support arms 40 are provided as connected to the vessel container wall to support the hoops at their ends opposite the hinged connectors 34 and 36. Such brackets 48 support the hoop to ensure that there is reasonable alignment of the clamping blocks with the lugs.

The discreet components for the lid closure device 22 provides for complete interchangeability of components regardless of the size of the vessel. This arrangement avoids a need to provide a custom design for each vessel. Instead, the components of this system may be applied to any size vessel. The only change is in the size of the hoop which is preferably made from standard grades of steel bar. Furthermore, the multiple component design accommodates manufacturing tolerances, particularly as described with respect to FIGS. 3 through 14 while achieving at the same time an excellent seal of the lid to the vessel container.

Figure 3:
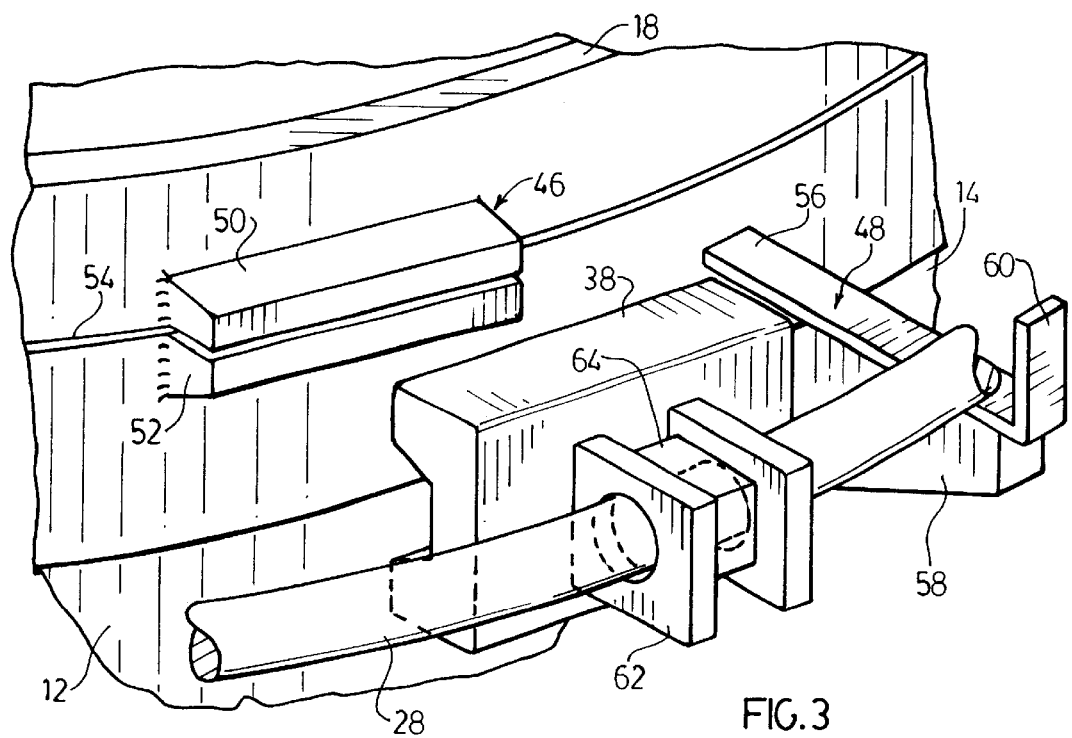
FIG. 3 is an enlarged view of the relationship of the clamping block to the container lugs.

FIG. 3 is an enlarged view of a portion of the hoop 28 with clamp block 38 and the spaced apart lugs 46 which are individually designated 50 and 52. A slight spacing 54 is shown between the container 12 and the lid 18. Further details of the support 48 are shown. The support has a plate 56 which is supported on the container wall 14 by way of a web brace 58. The support plate 56 has upturned end 60 which contains the hoop 28 to prevent it jumping off of the support 48. The clamping block 38 has spaced apart standards 62 with a centering block 64 provided therebetween. The centering block 64 limits the degree of pivot of the clamping block 38 as it floats on the hoop 28. Further details of that mechanism shall be described with respect to FIGS. 6 and 7.

Figure 4:
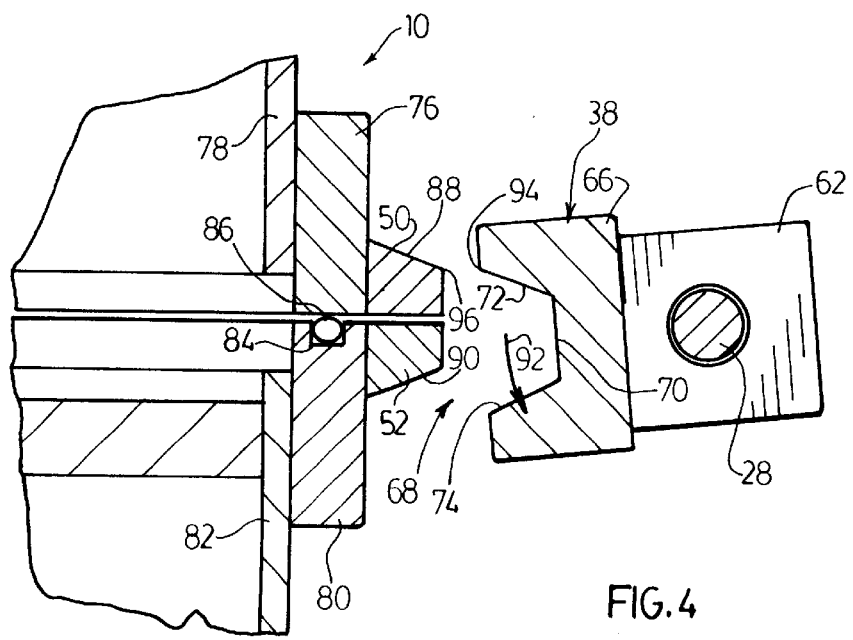
FIG. 4 is a section through the arrangement of FIG. 3.
Figure 13:
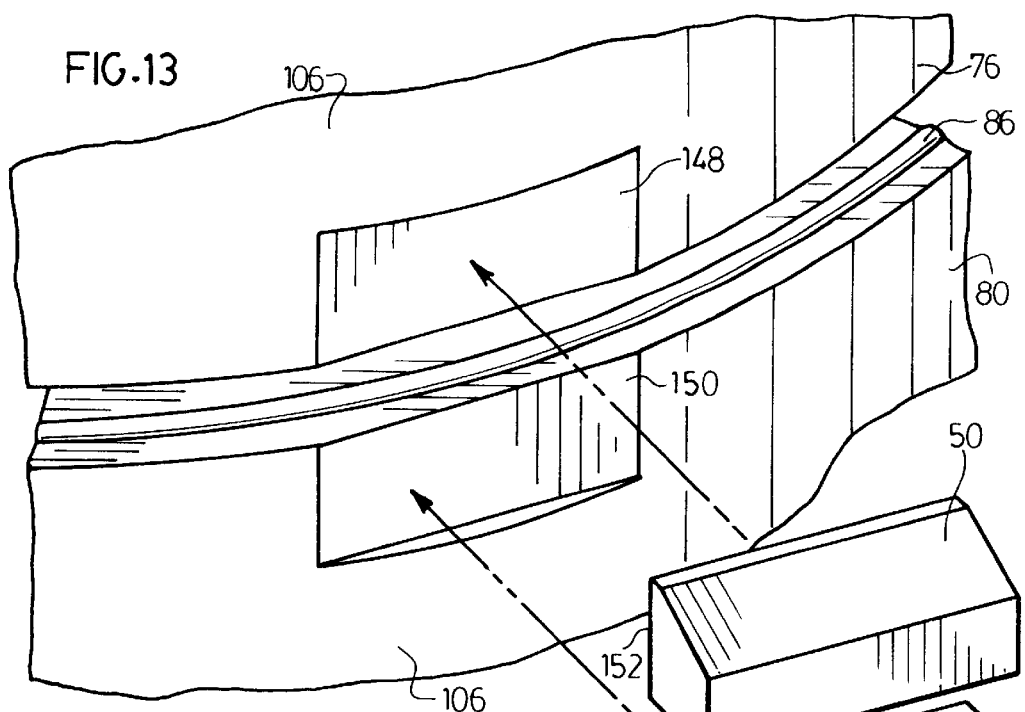
FIG. 13 is a view showing the lugs to be mounted on the vessel container and vessel lid.
Figure 14:
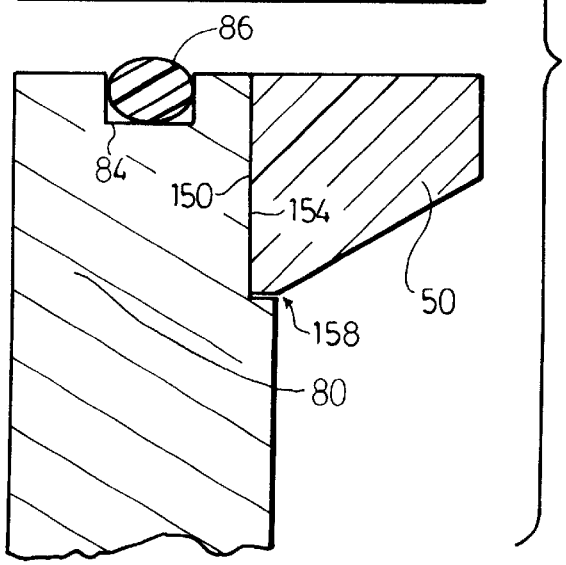
FIG. 14 is a section through that assembly before welding.

Turning to FIG. 4, the function of the centering device 64 can be better appreciated. The clamping block 38 comprises a solid block of material 66 with a channel 68 machined therein. The channel 68 has a base 70 with opposing inwardly sloped faces 72 and 74. The vessel 10 has a band 76 welded to the vessel lid wall 78. Correspondingly, a band 80 is welded to the container wall 82. The lower band 80 has a channel 84 machined therein to receive an O-ring seal 86. The respective lugs 50 and 52 are welded to the band 76 and 78. The lugs 50 and 52 may be secured to the bands in a variety of ways such as shown in FIGS. 13 and 14. In any event, the lugs 50 and 52 present sloping faces 88 and 90 which are cammed towards each other by the correspondingly sloped faces 72 and 74 of the clamp block 38. The centering device 64 provides for a floating of the clamp block 38 about the hoop 28 as signified by arrow 92. However, the upper leading edge 94 of the channel 68 is always slightly above the leading edge 96 of the lug 88 such that when the hoops are drawn together, the face 72 rides up onto face 88 to commence the clamping action. This avoids the jamming of the clamping blocks during the closure of the system 22.

By drawing the hoops 26 and 28 together, the respective clamping blocks 38 are drawn up onto the respective lugs 50 and 52 to wedge the lugs 50 and 52 together and in turn compress the seal 88 between opposing faces 98 and 100 of the band 76 and 80. The design of the channel 68 is such that the mating faces of the clamping block and of the lugs ensures that the lugs are squeezed to their fully closed position while leaving a space 102 between the face portion 104 and the clamping block and the exterior walls 106 of the bands 76 and 80.

Further details of the block centering device 64 are described with respect to FIGS. 6 and 7 and alternative embodiments therefor are described with respect to FIGS. 8 through 12. In FIG. 6 the centering mechanism 64 is a U-shaped section secured to the hoop 28. With reference to FIG. 7, the U-shaped section 64 may be fabricated from steel sheet and bent to the shape shown. The steel U-shaped member may be welded to the hoop 28 at weld points 108 to thereby fix relative to the hoop 28, the position of the ends 110 of the legs 112 of the U-shaped member. The position of the ends 110 permit the block 38 to float and pivot about the hoop 28 by way of the arms 62 mounted on the hoop. However, the extent of pivot is limited by the rear face 114 of the block abutting either the upper end 110 or lower end 111 in limiting the block travel. Such limited block travel allows for the desired floating of the block but at the same time ensures that the end 94 of the block channel 68 is slightly above the end 96 of wedge 50 to ensure that the blocks fit onto the lugs while drawing the hoops 26 and 28 to the closed position. This floating of the blocks greatly accommodates tolerances in the relative positionings of the lugs to the clamp block and avoids the need to machine precisely the lugs from the bands 76 and 78 of the vessel. Instead, the lugs may be welded to the band in a manner to be discussed with respect to FIGS. 13 and 14.

With reference to FIGS. 8 through 12, alternative embodiments for the block centering mechanism are shown. In the embodiment of FIG. 8 the hoop 28 has a lug 116 welded thereto with a threaded bolt 118 provided therein which includes a lug nut 120. The threaded bolt, as shown in FIG. 10, has a spring loaded washer 122 fixed by bolt 124 where the spring 126 is captured between the washer 122 and the lug 116. Positioning of the threaded bolt 118 determines the position of the nut 124 which in turn butts up the rear face 114 of the clamp block 38. Such positioning of the nut 124 thereby determines the extent of travel of the clamp block as well as its positioning. These devices provide for easy adjustment of the position of the clamp blocks once the lid closure system is assembled and ready to be used. An alternative to the system of FIG. 8 is shown in FIG. 9 where a lug 128 is welded to hoop 28. A threaded bolt 130 is threaded into lug 128. The position of the bolt 130 is determined by the compressed spring 132 the tension of which is determined by positioning of nut 134. Similarly, the free end 136 determines the extent of float of the block 38.

With reference to FIGS. 11 and 12, the centering mechanism includes a lug 138 welded to hoop 28. A threaded bolt 140 has a wing nut 142 secured thereto. The bolt 140 is threaded through lug 138 where its position is locked by lock nut 144. One can readily locate the bolt 140 by turning the wing nut 42 and then locking it in place with the nut 144. The free end 146 of the bolt 140 thereby determines the extend which the block 38 pivots about the hoop 28.

Referring to FIGS. 13 and 14, one method of securing the lugs in place is described. As shown in FIG. 13, the lid band 76 is located above the container band 80. The lugs 50 and 52 may be welded to the exterior surfaces 106 of the band 76 and 80. The use of an appropriate jig can position the lugs while they are being welded to the bands. Keeping in mind that the floating blocks will compensate for tolerances in positioning of the lugs on the bands, such procedure functions very well in locating the lugs on the band. According to one embodiment of this invention, to assist in locating the lugs on the band, flats 148 and 150 may be machined into the surfaces 106 of the bands. The lugs which also have flat faces 152 and 154 can be positioned on the respective flats 148 and 150 in the manner shown in FIG. 14. With the lugs in place, a fillet weld may be provided at junctures 156 and 158 to complete the connection of the lugs to the bands 76 and 80. In accordance with this embodiment, the lugs may be machined from straight stock without the requirement of bending the lugs. The straight lugs may be either welded directly to the band 76 and 80 or the bands may include some preparation such as machining of the flats 148 and 150 on the surface of the bands. Clearly this technique avoids the need to perform elaborate machining techniques on the lid band and the container band, which was common to the prior art forms of closure mechanisms.

Figure 15:
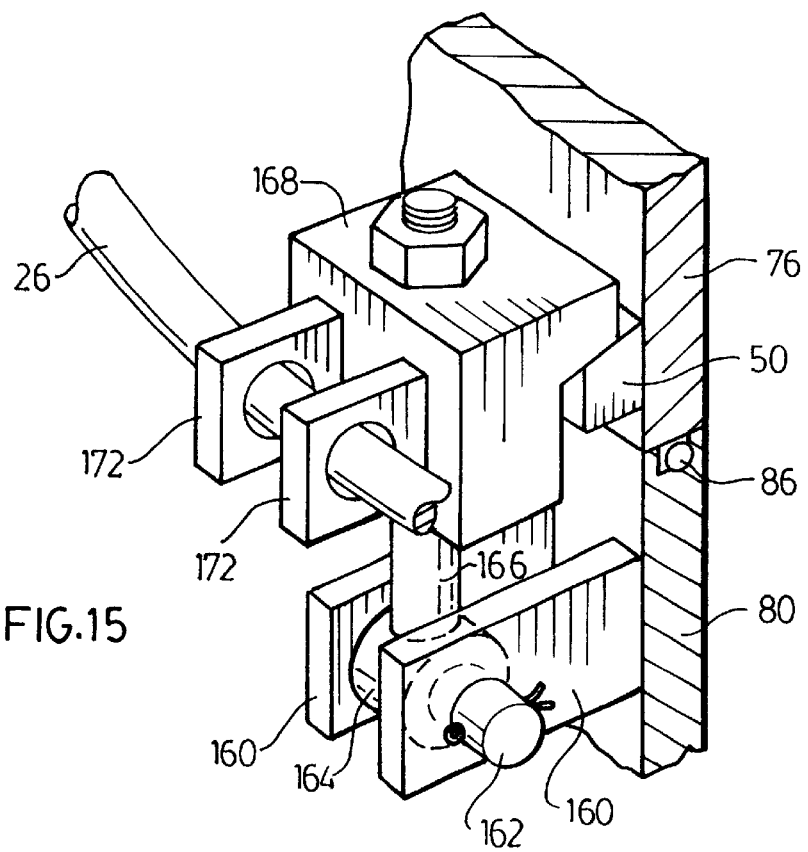
FIG. 15 shows an alternative embodiment for the clamp block system.
Figure 16:
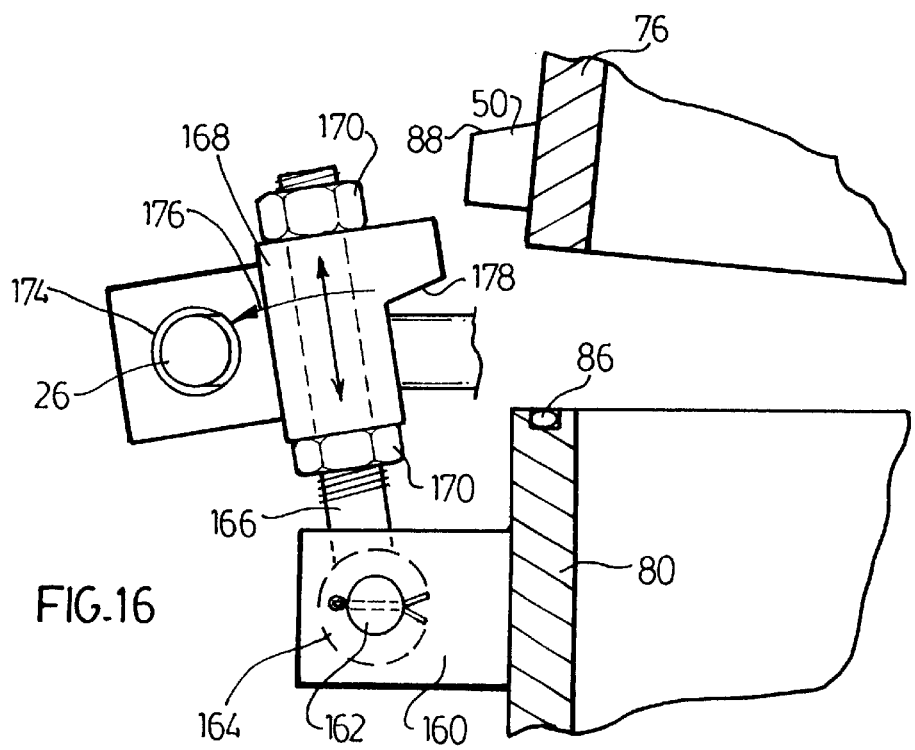
FIG. 16 shows the clamp block system of FIG. 15 released and with the lid partly opened.

An alternative embodiment for the use of the hoop mechanisms in drawing the lid closure system closed is shown in FIGS. 15 and 16. The lid band 76 has the lug 50 secured thereto. The container band 80 has the usual seal 86 provided therein. Secured to the band 80 are standards 160 which are spaced apart and have a shaft 162 extending therethrough. A bushing 164 is provided on the shaft which is secured to an arm 166. The arm 166 is in turn secured to a clamp block 168. As shown in more detail in FIG. 16, the position of the clamp block 168 is determined by lock nuts 170 which are threaded onto the arm 166. The clamp block 168 has spaced apart lugs 172 through which the hoop 26 or 28 extends by way of the aperture 174. With the hoops in the open position, as shown in FIG. 16, the clamp blocks 168 pivot about shaft 162 in the direction of arrow 176 to the open position. When the hoops 26 and 28 are drawn to the closed position, the clamp blocks 168 are pulled onto the lugs 150 to clamp the lid to the container and compress seal 86, by way of the interaction of the sloped face 178 of the clamp block riding up onto face 88 of the lug 50. It is appreciated that the supports for hoops 26 and 28 are lowered to accommodate the slight downward movement of the hoops as the clamp blocks 168 pivot from their closed position to their open position. The positioning of the clamp blocks 168 may be determined by the lock nuts 170 or such positioning may be fine tuned upon assembly of the lid closure system.

Figure 17:
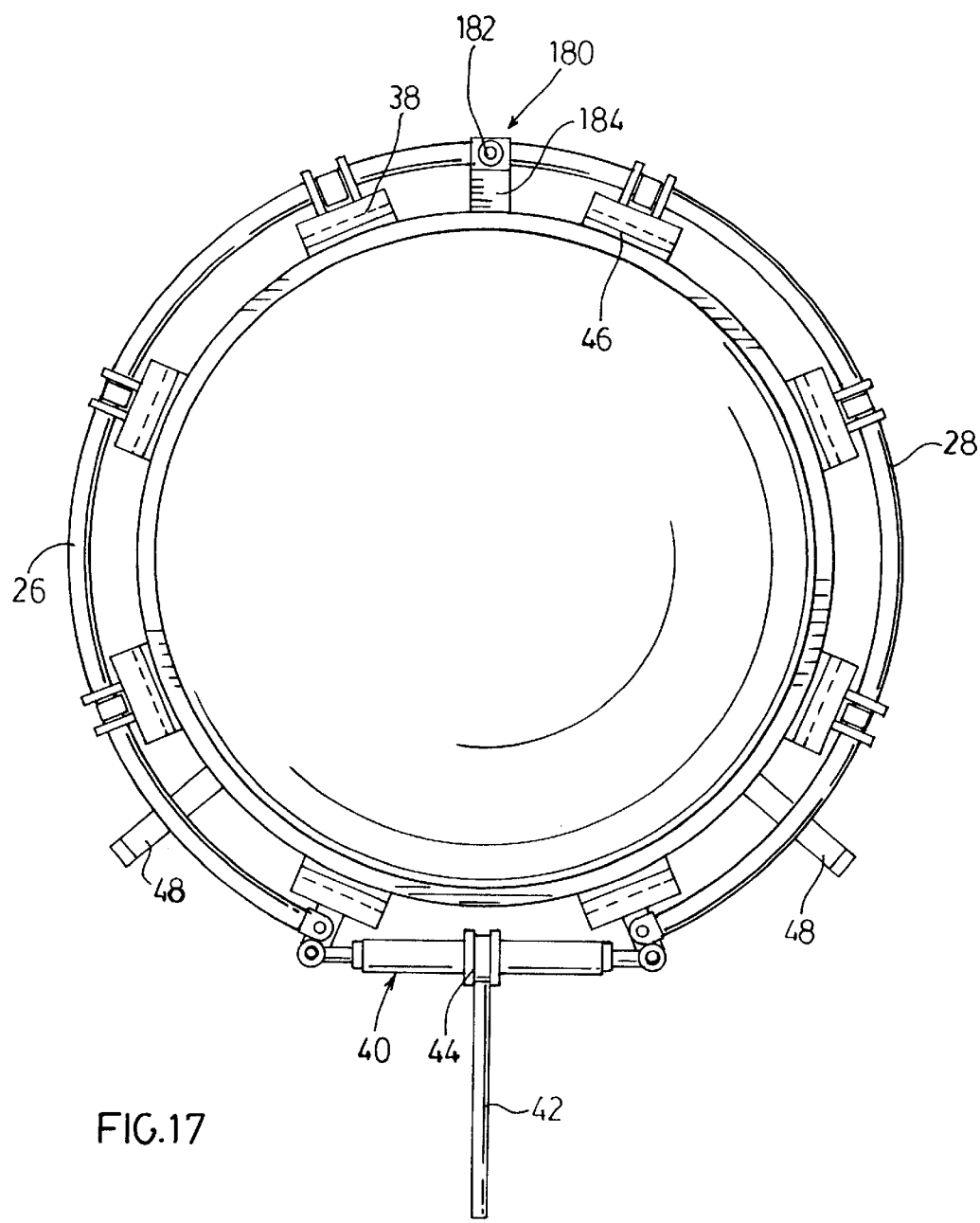
FIG. 17 is a top view of the lid closure system with an alternative embodiment for the hoop pivots.
Figure 18:
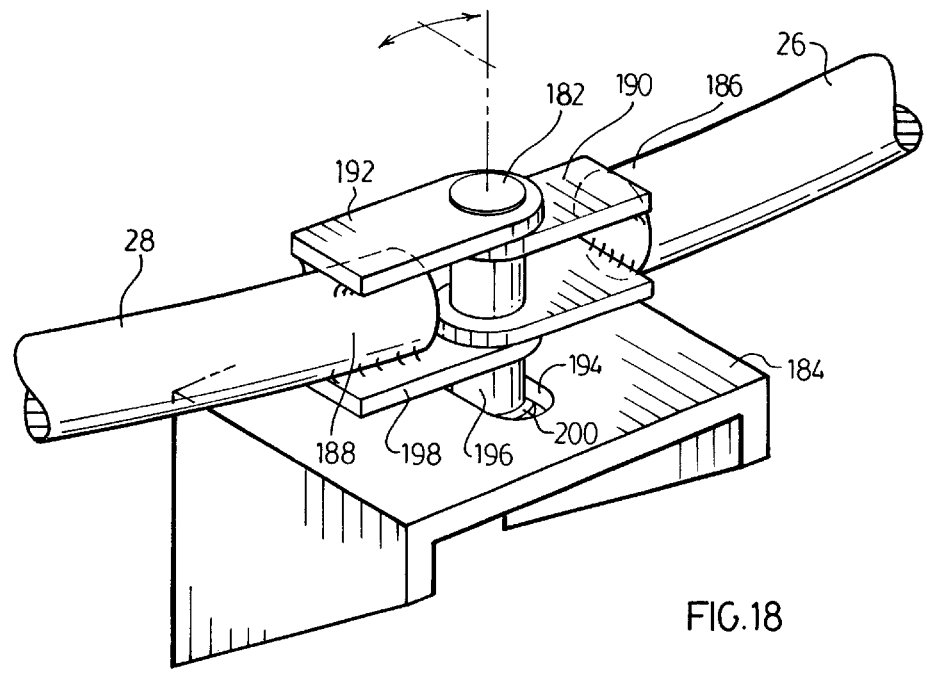
FIGS. 18 and 19 show further details of the hoop pivot.
Figure 19:
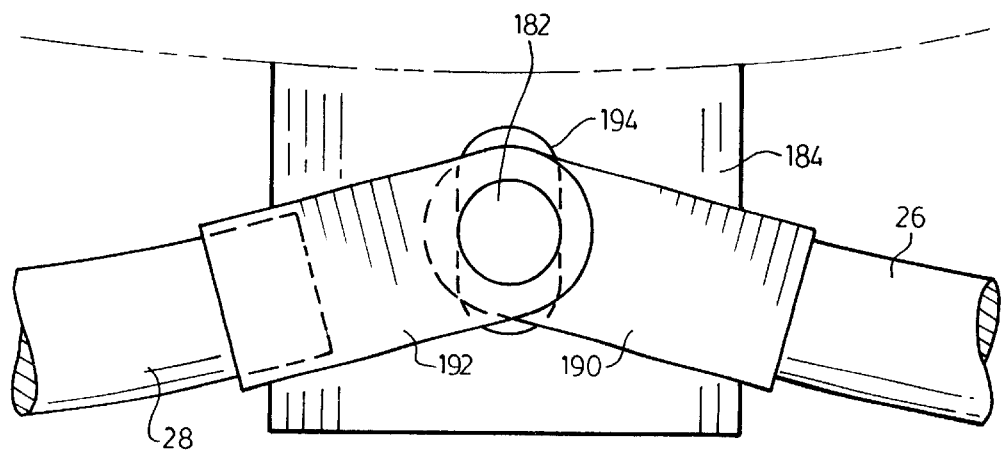

With reference to FIG. 17, an alternative embodiment for the pivot connection of the hoops 26 and 28 is shown. The pivot connection 180 which has a pivot shaft 182, is located in line with the circular pattern defined by the hoops and the pivot point. This greatly increases the overall strength of the system and more evenly distributes the forces about the clamp blocks 38 adjacent the pivot 180. The pivot 180 is mounted on a standard 184 which in turn is connected to the container wall. As with the embodiment of FIG. 2, when the hoops are released, the clamp blocks 38 clear the lugs 46 to permit opening of the lid. In moving the hoops to the open position, reference is made to FIGS. 18 and 19. The respective hoops 26 and 28 have their ends 186 and 188 secured to hinge members 190 and 192. The hinge members are pivotally connected to the shaft 182. The standard 184 has an elongate slot 194 provided therein. The shaft 182 has a bushing 196 which fits within the slot and is captured between the lower plate 198 and the flange 200 in the slot 194. During the opening and closing of the lid system, the hoops 26 and 28 are either drawn together or moved apart. The provision of the pivot 182 in the slot 194 allows movement of the pivot point for the hoops to ensure that the clamp blocks 38 adjacent the pivot point clear the respective sets of lugs 46. The provision of the slot 194 greatly facilitates the speed with which the lid closure system may be opened to release the lid and as well the speed with which it may be closed. This feature in combination with the floating clamp blocks ensures a repeatable clamping of the lid to the container.

Figure 20:
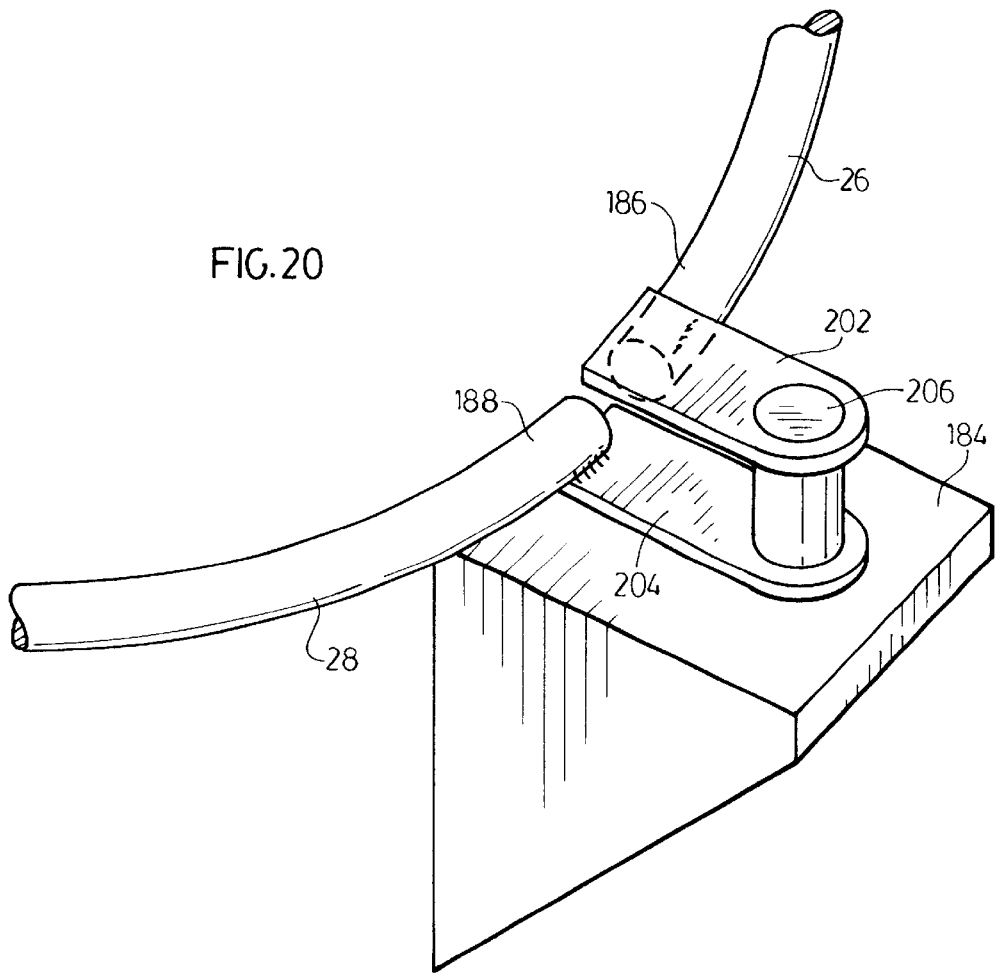
FIGS. 20 and 21 show an alternative embodiment for the hoop pivot.
Figure 21:
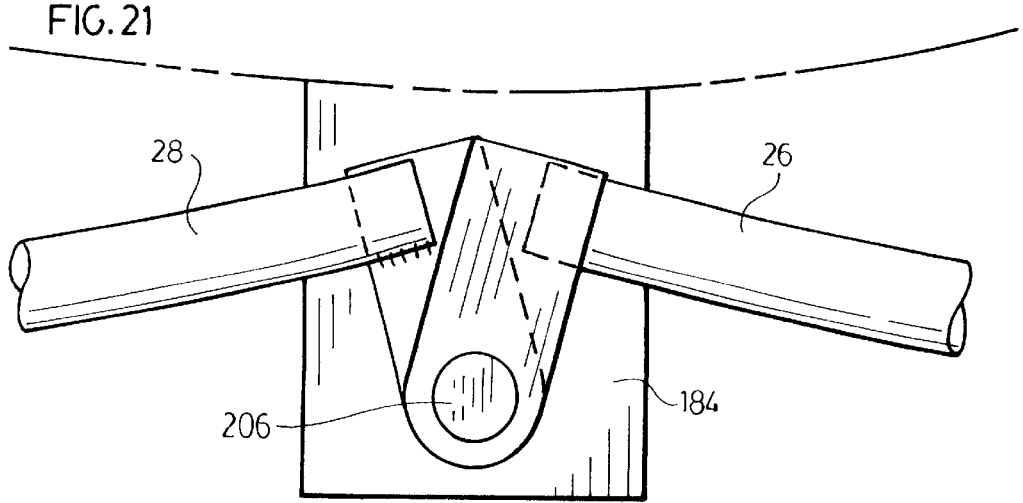

With reference to FIGS. 20 and 21, an alternative embodiment for the pivoting open of the hoops 26 and 28, is shown. Hoop 26 is connected to arm 202 while hoop 28 has its end 188 connected to arm 204. The arm 202 and 204 are pivoted about shaft 206 which is secured to the standard 184. By offsetting the pivot shaft 206 relative to the hoops 26 and 28, more travel is provided for the clamp blocks adjacent the pivot point to ensure that they clear the lug sets.

Figure 22:
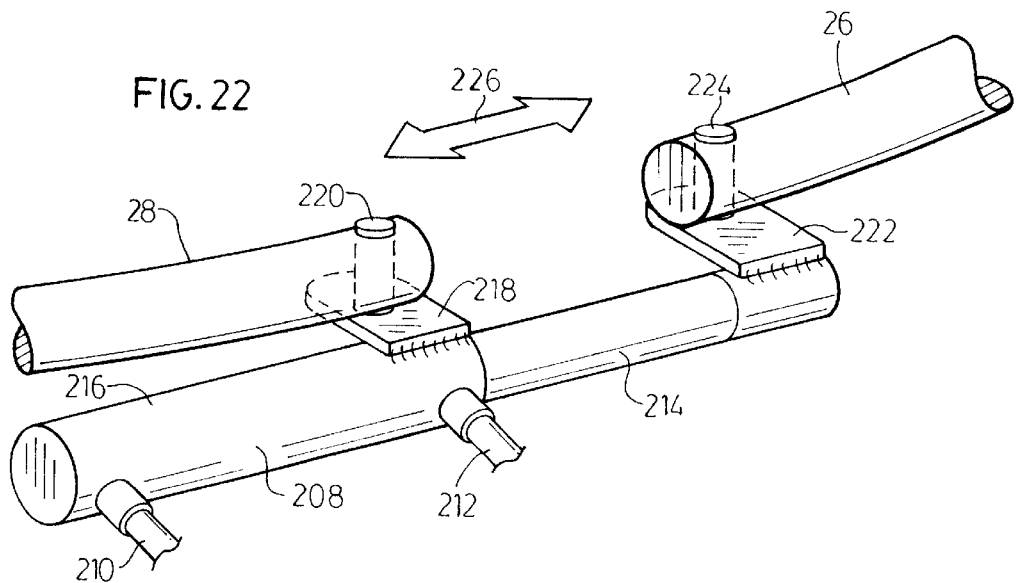
FIG. 22 shows the use of an air cylinder to draw together or release the hoop of the lid closure system.

Although the mechanical crank system of FIG. 2 is adequate for most situations in drawing the hoops together to close the lid, an alternative embodiment is provided in FIG. 22 where a hydraulic or pneumatic cylinder 208 with lines 210 and 212 extend or retract the arm 214. The cylinder wall 216 is secured to lug 218 which in turn is connected to hoop 28 by pin 220. The arm 214 is secured to lug 222 which in turn is secured to hoop 26 by pin 224. By extending or retracting the arm, the hoops 26 and 28 are either drawn towards one another to close the lid or moved apart, as demonstrated by arrow 226 to release the lid.

Figure 23:
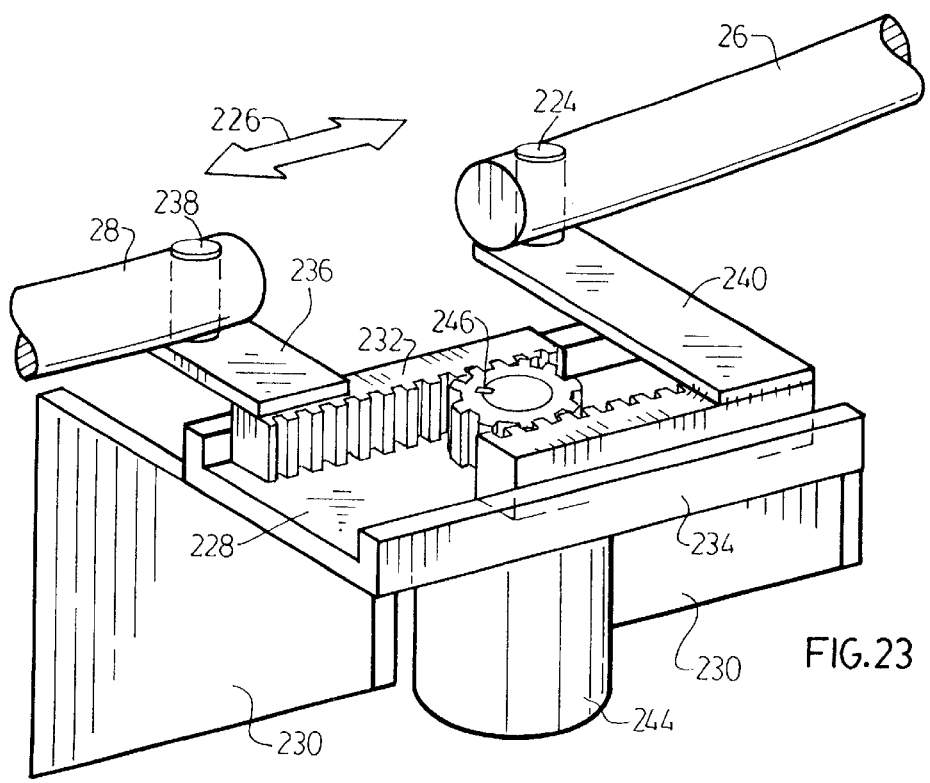
FIG. 23 shows an alternative embodiment using a rack and pinion to draw in or release the hoop.

In FIG. 23 a rack and pinion system is provided to open or close the hoops 26 and 28 in the direction of arrow 226. The rack and pinion system comprises a base plate 228 mounted on support 330 which is connected to the container outside wall. The base plate 228 carries the racks 232 and 234. Rack 232 is connected to hoop 28 by way of lug 236 which is connected to the hoop by pin 238. Correspondingly, rack 234 is connected to hoop 26 by lug 240 which in turn is connected to the hoop by pin 242. A motor 244 which may be hydraulically, pneumatically or electrically operated, drives the pinion 246 by rotating the pinion in a first direction. The hoops 26 and 28 are drawn together by rotating the pinion 246 in the opposite direction. The hoops are moved apart in the direction of arrow 226 to release the lid. The system of FIGS. 22 and 23 lend themselves to automation and additional safety features. The controls for operating the cylinder 208 of FIG. 22 or the electrical motor of FIG. 23 may include a pressure sensor which will nor permit release of the lid closure system unless about atmospheric pressure is sensed within the container. This avoids opening of the vessel when the lid is either under positive or negative pressure and thereby avoid injury or potential spills. In that regard, a level sensor may also be provided in the vessel to ensure that the lid is not open unless the liquid level in the vessel is below the level of the lid. Again, these automated systems function very well with the lid closure system because the floating blocks accommodate tolerances in the lid closure system which ensures that the lid is closed each time on a consistent reliable basis.

Figure 24:
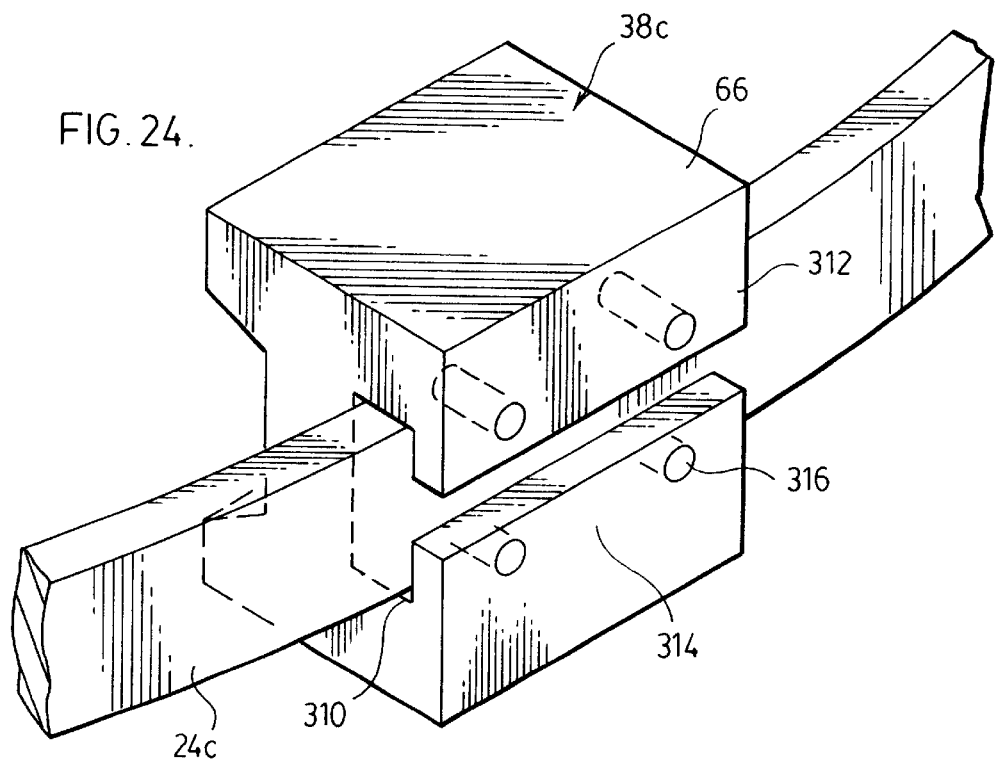
FIG. 24 is an alternative embodiment of a clamp block and hoop.
Figure 25:
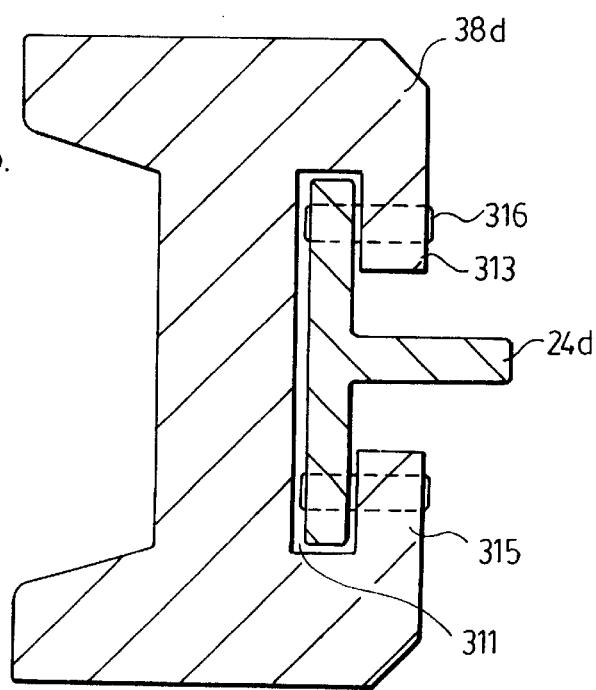
FIG. 25 is another alternative embodiment of a clamp block and hoop.

With reference to FIGS. 24 and 25, alternative embodiments for the hoop 28 and optional block centering mechanism are shown. FIG. 24 shows a hoop 24c having a rectangular cross-section attached to a modified clamp block 38c. A rectangular shaped channel 310 is machined through the solid block of material 66. Channel 310 is located on the outer side of clamp block 38c opposite to channel 68 and extends in the generally horizontal direction. The channel 310 has a downwardly directed flange 312 and an upwardly directed flange 314 for receiving fasteners 316. Hoop 24c is fed through channel 310 and connected to the clamp block 38a by fasteners 316. There is sufficient play between the hoop 24c and the channel 310 to provide for a centering action of the clamp block 38c onto the lugs in the manner discussed with respect to, for example, FIG. 7.

FIG. 25 shows a hoop 24d having a T-shaped cross-section. A rectangular channel 311 is machined through the solid block of material 66 in a manner similar to channel 310 of the embodiment of FIG. 24. The channel 311 has a downwardly directed flange 313 and an upwardly directed flange 315 for receiving fasteners 316. The channel 311 is sized to accommodate the top section of the T-shaped cross-section. Again there is sufficient play between hoop 24d and clamp block 38d to provide for the self-centering feature onto the lugs.

With reference to FIGS. 26 through 30, a quick connect/disconnect mechanism 319 for the hoop 24 of the pressure vessel 10 is shown.

The quick connect/disconnect mechanism 319 for the hoop 24 has several advantages. The mechanism 319 is entirely mechanical therefore can be easily repaired. The mechanism 319 can be used in environments that are not suitable for electronic devices or require very sophisticated electronics, for example environments with water, fumes or sparks. Additionally, the quick connect/disconnect mechanism 319 for the hoop 24 is more efficient. The operator is able to spend less time and expend less energy when opening and closing the lid 18. The quick connect/disconnect mechanism 319 for the hoop 24 enables the clamp screw mechanism 40 to have a shorter operable distance, thus the operator requires less time to release or tighten the clamp screw mechanism 40. The clamp screw mechanism 40 is released until the hoop tension is relieved sufficiently to allow the quick connect/disconnect mechanism 319 to be disconnected.

Figure 26:
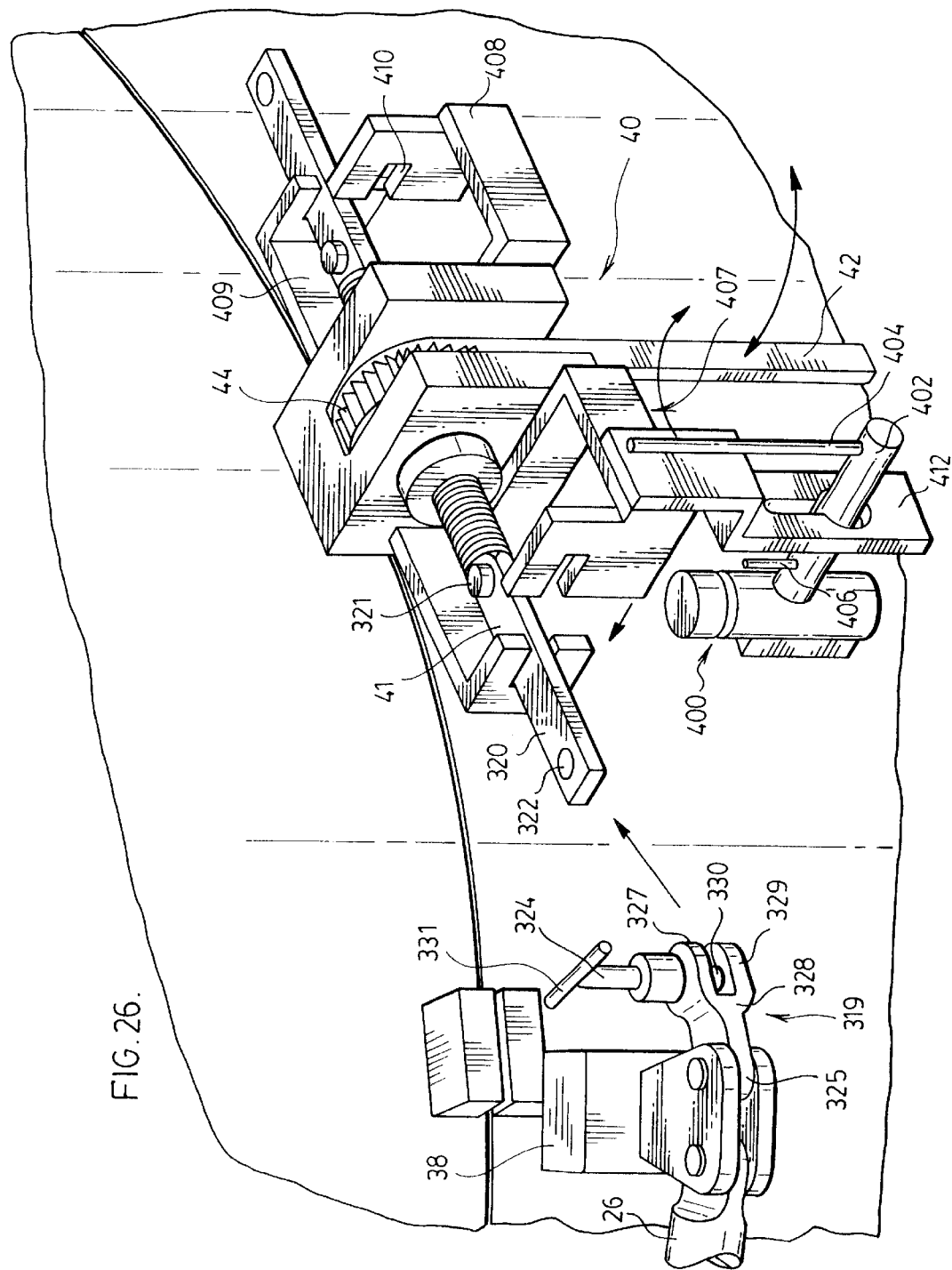
FIG. 26 is a perspective view of a quick connect/disconnect mechanism for a hoop of a pressure vessel and a safety mechanism of a pressure vessel.

Clamp screw mechanism screw 41 has an unthreaded bar portion 320 that extends from the threaded portion. In the embodiment of FIG. 26, unthreaded bar 320 is a flat bar but other shapes of bars can also be used. Unthreaded bar 320 has an aperture 322 located adjacent the distal end of the bar 320. Aperture 322 is sized to receive a pin 324.

Pin 324 is pivotally attached at 325 to the connection between hoop portion 26 and clamp block 38. Pin 324 is held in a pin support 328 that has an upper lug 327 and a lower lug 329 in a fork-type arrangement with a bore 330 extending therethrough. Pin 324 is selectively retractable by lifting on fingergrip 331 for providing an open space between the lugs 327 and 329.

Figure 27:
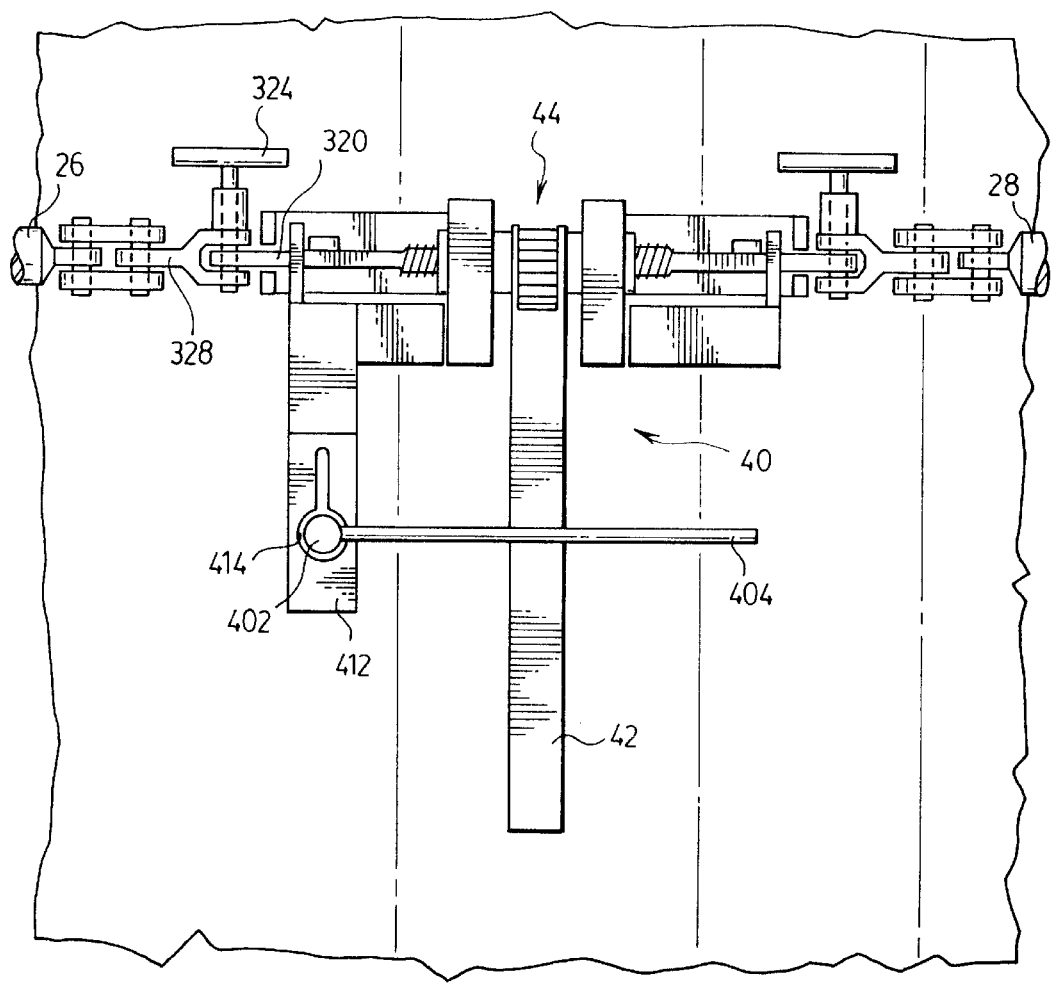
FIG. 27 is a front view of a safety mechanism of a pressure vessel.

FIG. 27 shows the pin 324 when it is connected to the unthreaded bar 320. In this position, the aperture 322 of unthreaded bar 320 is aligned with bore 330 and placed between the upper 327 and lower lugs 329 of the pin support 328. The pin 324 is moved to an unretracted position to provide a connection therebetween by extending through the aperture 322.

The quick release closure system 22 shown in FIG. 2 has an open position and a closed position. The addition of the quick connect/disconnect mechanism 319 for the hoop provides a third, released position for the closure system 22. Operation of the quick connect/disconnect mechanism 319 for the hoop is shown in FIGS. 28 through 30, which depict the three positions.

Figure 28:
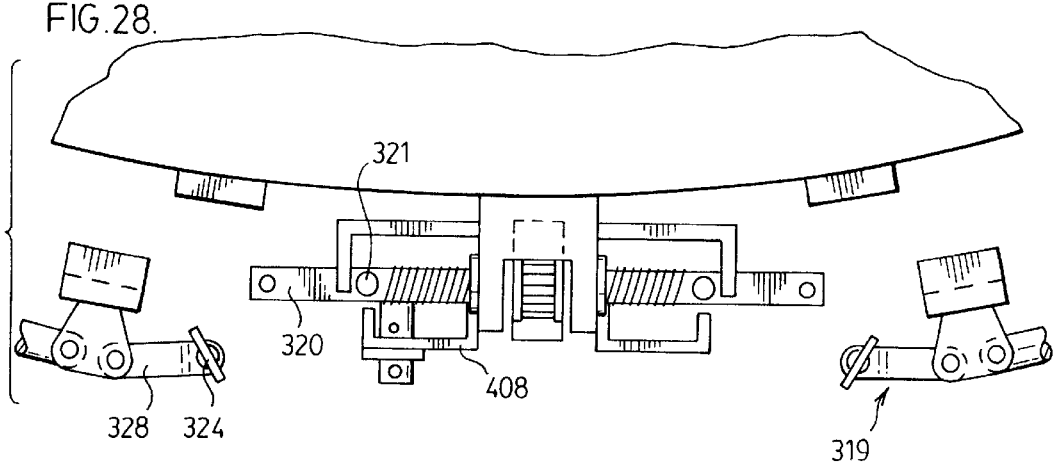
FIG. 28 is a top view of the quick connect/disconnect mechanism and safety mechanism of FIG. 26 in the released and unlocked position.

FIG. 28 shows the quick connect/disconnect mechanism 319 in a released position with the pin 324 remote from unthreaded bar 320. The operator then moves pin 324, by using fingergrip 331, to the open position of FIG. 29, in which the pin 324 connects to unthreaded bar 320. In this position, hoop tension is at a sufficiently low level to enable connection or disconnection of the pin 324 from the unthreaded bar 320.

Figure 29:
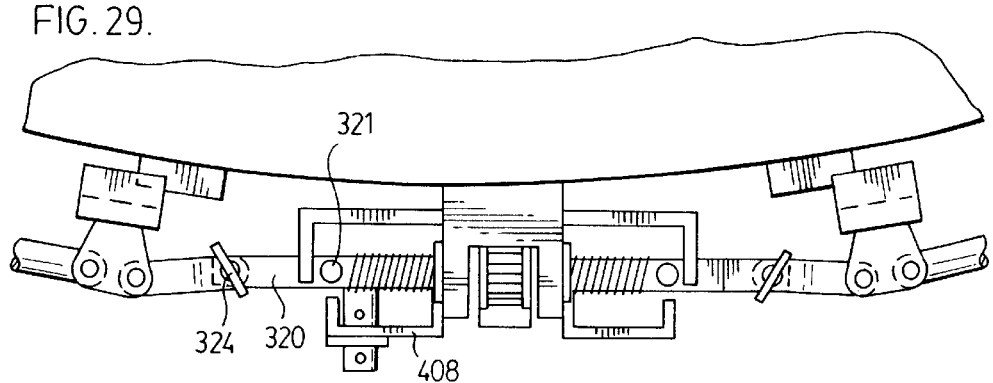
FIG. 29 is a top view of the quick connect/disconnect mechanism and safety mechanism of FIG. 26 in the connected and unlocked position.
Figure 30:
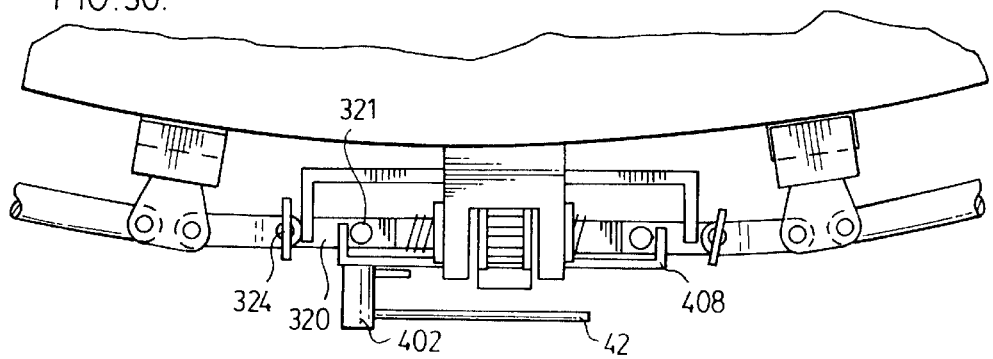
FIG. 30 is a top view of the quick connect/disconnect mechanism and safety mechanism of FIG. 26 in the connected and locked position.

Between the partially open position of FIG. 29 and the closed position of FIG. 30, the operator actuates the clamp screw mechanism 40 using a crank arm 42. Actuation of the clamp screw mechanism 40 increases the hoop tension and thus causes pin 324 to be under shear stress. The pin 324 is designed to withstand the maximum shear stress, which occurs when the closure system 22 is in the closed position of FIG. 30 and the vessel is pressurized.

In a preferred embodiment, the ratchet system, which includes clamp screw mechanism 40, crank arm 42 and ratchet 44, is removable. The removable ratchet system facilitates module replacement for repair.

Referring again to FIGS. 26 through 30, in particular FIGS. 26 and 27, a safety mechanism for the pressure vessel 10 will now be described.

A locking structure 407 has arms 408 that are movable in the horizontal direction to selectively engage the clamp screw mechanism 40 and restrict movement thereof. Each arm 408 has a channel 410 machined therein for receiving the unthreaded bar 320. Stop 321, which protrudes from unthreaded bar 320, restricts engagement of channel 410 with the unthreaded bar 320 when closure system 22 is in the released or open position, as shown in FIGS. 28 and 29.

In the locked position, shown in FIG. 30, the channel 410 engages the unthreaded bar 320 and stop 321 abuts arm 408 thereby restricting movement of the clamp screw mechanism 40 in an opening direction.

The locking structure 407 of this embodiment additionally has a guide arm 409 for guiding movement of unthreaded bar 320.

The safety mechanism operates in conjunction with a valve 400 of the pressure vessel. Stem 402 extends from and controls operation of valve 400. Stem 402 has a handle 404 and a stud 406 extending radially therefrom. Handle 404 is located adjacent the distal end. Stud 406 is located between the valve 400 and the handle 404. The handle 404 and stud 406 extend in a generally upward direction when the valve 400 is in an open position and extends in a generally horizontal direction with the valve 400 is in a closed position.

Handle 404 is sized to interfere with movement of the crank arm 42 when valve 400 is in the closed position. The handle 404 may be extendable in order to provide an operator with additional leverage to facilitate opening and closing of valve 400.

The locking structure 407 further includes a plate 412 that extends downwardly from arm 408. Stem 402 extends through a keyhole shaped aperture 414 that is machined in plate 412. Aperture 414 shaped to allow upwardly extending stud 406 to pass therethrough thus enabling the locking structure 407 to move into engagement with the clamp screw mechanism 40.

With reference to FIGS. 28 through 30, operation of the safety mechanism will now be described. In the released position of FIGS. 26 and 28 and the partially open position of FIG. 29, the valve 400 is in the open position and arms 408 are remote from unthreaded bars 302. When the valve 400 is open, the pressure vessel cannot be operated.

From the partially open position of FIG. 29, an operator manually moves locking structure 407 towards the pressure vessel. Movement of the locking structure 407 causes arms 408 to engage unthreaded bars 320 and aperture 414 of plate 412 passes over stud 406 located on stem 402. The operator then closes valve 400 by turning stem 402 in the clockwise direction and the safety mechanism assumes the locked position of FIG. 30.

In the locked position, the handle 404 restricts movement of crank arm 42, arms 408 engage unthreaded bars 320 adjacent stops 321, and stud 406 maintains the locking structure 407 in the locked position. The operator is thereby restricted from opening the closure system 22 until the valve 400 is reopened.

It will be appreciated that although operation of the safety mechanism is shown in the same Figures as the hoop quick connect/disconnect mechanism, the safety mechanism can be used with any closure system for the pressure vessel lid 18.

Although preferred embodiments of the invention have been described herein in detail, it will be understood by those skilled in the art that variations may be made thereto without departing from the spirit of the invention or the scope of the appended claims.

What is claimed is:

1. A pressurized vessel having a quick release lid closure system for clamping a vessel lid to a vessel container,
   i) said lid having about its perimeter a plurality of circumferentially spaced apart lid lugs, said container having about its opening perimeter a corresponding number of opposing circumferentially spaced apart container lugs, said lid lugs and container lugs defining sets of opposing lugs, said opposing lugs having sloped faces which define a truncated wedge narrowing outwardly from said vessel, said wedge having a gap defined between said opposing lid lugs and container lugs, a compression seal provided between said lid and container for sealing said vessel when said lid is closed,
   ii) said closure system comprising an open hoop with spaced apart ends, said hoop carrying a plurality of spaced apart clamp blocks corresponding in number to said plurality of lug sets, each said clamp block having a truncated wedge shaped channel for mating engagement with said truncated wedge of a corresponding lug set,
   iii) means for pulling said spaced apart hoop ends towards one another to reduce the circumference of the hoop to move said clamp blocks onto corresponding said wedges and by virtue of said mating engagement of said clamp blocks with said wedges, drawing said opposing lugs together to close said gap and to seal said lid to said container by compressing said compression seal.

2. A vessel of claim 1, wherein said container has about its opening perimeter on its sealing face a channel to receive said compression seal, said lid having a sealing face, said container and lid sealing faces contacting to close said gap and complete said seal.

3. A vessel of claim 1, wherein said lid has a reinforcing ring about its perimeter, said vessel has a reinforcing ring about its opening perimeter, said lid lugs and said container lugs being provided on said respective lid and container rings.

4. A vessel of claim 3, wherein said lugs are welded to said container and lid rings, said lugs being essentially straight along their length.

5. A vessel of claim 4, wherein said ring for said lid and said container have flats machined therein to receive the respective lug for welding therein.

6. A vessel of claim 1, wherein a mounting means mounts said clamp blocks on said hoop, said mounting means allowing said clamp blocks to float to a predetermined extent on said hoop to accommodate manufacturing tolerances in locating said lugs on said lid and said container, said mounting means in providing for said predetermined extent of movement maintaining said clamp blocks at an orientation that said wedge shaped channel engages the sloping surfaces of said wedge defined by said lug set.

7. A vessel of claim 6, wherein said mounting means includes means for adjusting orientation of said clamp blocks to align them with said lug sets.

8. A vessel of claim 7, wherein said adjusting means comprises a threaded stem with a stop to locate orientation of said clamp blocks.

9. A vessel of claim 1, wherein said hoop is a steel rod, support means on said container to support said hoop about said vessel, outside of and opposite said lug sets.

10. A vessel of claim 9, wherein said steel rod has a rectangular cross-section.

11. A vessel of claim 9, wherein said steel rod has a tee cross-section.

12. A vessel of claim 9, wherein said hoop rod is split into two semi-circular halves and joined at a pivot connection at one end and open at the other end, said rod pivot connection is secured to said vessel.

13. A vessel of claim 12, wherein said rod pivot connection includes a slide to permit said pivot connection to slide inwardly and outwardly during closing and opening of said vessel to facilitate said clamp blocks clearing said lug sets on opening of said vessel.

14. A vessel of claim 13, wherein said rod pivot connection is in line with said hoop.

15. A vessel of claim 1, wherein said pulling means for said hoop ends comprises lever operated oppositely threaded screw system for pulling said ends towards one another to move said clamp blocks onto said wedges and draw said opposing lugs together.

16. A vessel of claim 15, wherein said pulling means includes a pneumatically operated cylinder, an hydraulic cylinder or an electric motor driven rack and pinion screw.

17. A vessel of claim 15, further comprising a safety mechanism for preventing use of said lever operated oppositely threaded screw system when said lid is sealed.

18. A vessel of claim 15, wherein said pulling means for said hoop ends further comprises a quick connect/disconnect mechanism, said quick connect/disconnect mechanism being retained in a connected position to said pulling means by hoop tension.

19. A vessel of claim 18 wherein said quick connect/disconnect mechanism comprises at least one fastener connected at each of said hoop ends for selectively connecting hoop ends to said oppositely threaded screw system.

20. A vessel of claim 19 wherein said at least one fastener is pivotally connected to said hoop end.

21. A vessel of claim 18, further comprising a safety mechanism.

22. A vessel of claim 21 wherein said safety mechanism comprises means for preventing use of said pulling means when said lid is sealed.

23. A method for opening said closure system including said quick connect/disconnect mechanism of claim 23 comprising:
  i) moving said safety mechanism from the closed position to the open position;
  ii) operating said pulling means in an opening direction until said hoop tension has been relieved
  iii) disconnecting said quick connect/disconnect mechanism.

24. A pressurized vessel having a quick release lid closure system for clamping a vessel lid to a vessel container,
  i) said vessel lid and/or said vessel container having a plurality of spaced apart first components of said lid closure system,
  ii) a hoop positioned about said vessel and located opposite said first components of said lid closure system, said hoop carrying a corresponding plurality of a second component of said lid closure system, said plurality of said second components being aligned with said first components, said hoop having spaced apart ends,
  iii) means for pulling said hoop spaced apart ends towards one another to move said second components onto said first components to an extent which clamps said lid to said container, said pulling of said hoop ends towards one another exerting an inwardly radially directed force of said second components on said first components; and
  wherein said first component is a lug provided on said lid and said second component is a swing lug pivotally mounted on said vessel, said hoop carrying said swing lugs to pivot them towards and move said lid lugs to draw said lid closed on said container when said means pulls said hoop ends towards one another.

25. A vessel of claim 24, wherein said first components and said second components have tapered surfaces which when engaged move said lid towards said container.

26. A vessel of claim 24, wherein said first component is a lug provided on said lid and an opposing lug provided on said container, said second component is a clamp block carried by said hoop, said hoop moving said clamp blocks onto said lugs to move them together and draw said lid closed on said container when said means pulls said hoop ends towards one another.

27. A vessel of claim 26, wherein said first components and said second components have tapered surfaces which when engaged move said lid towards said container.

* * * * *